Sept. 25, 1951            A. BECHLER            2,568,785
ROCKING TYPE OF DRILLING AND TAPPING
APPLIANCE FOR AUTOMATIC LATHES
Filed Sept. 23, 1946
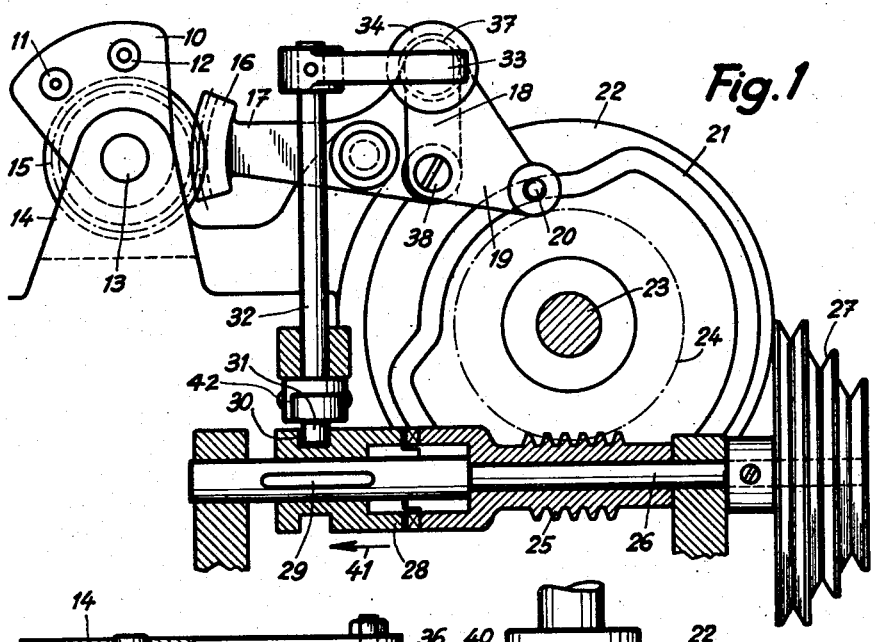
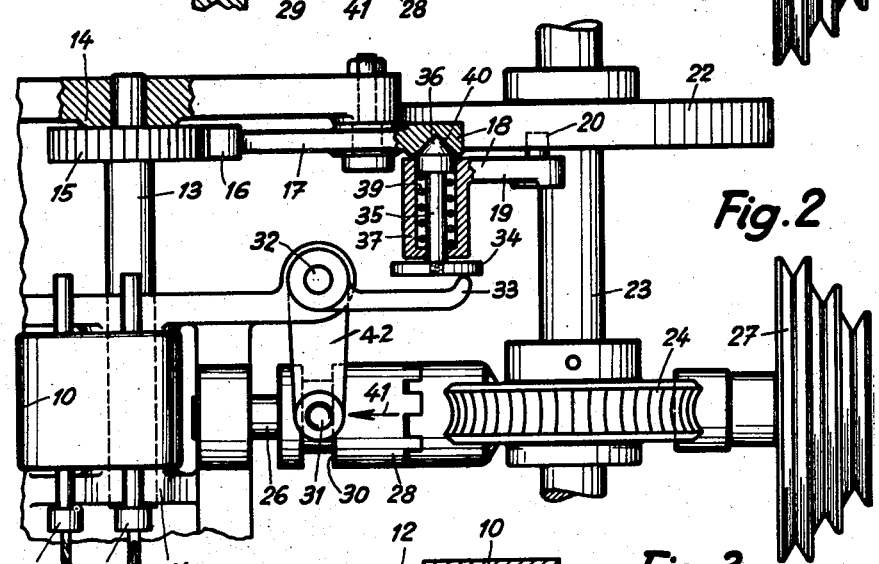
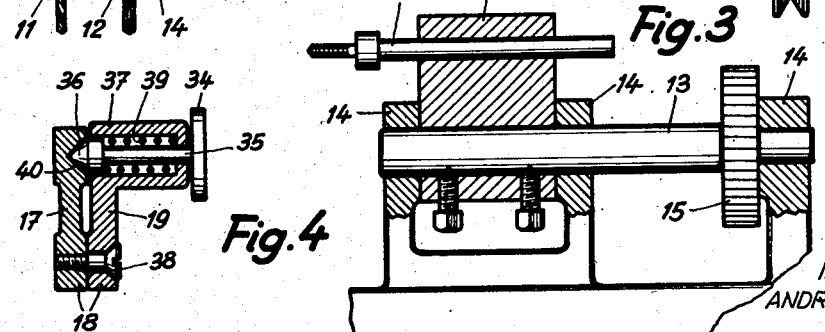
INVENTOR:
ANDRÉ BECHLER Patented Sept. 25, 1951

2,568,785

UNITED STATES PATENT OFFICE 2,568,785

ROCKING TYPE OF DRILLING AND TAPPING APPLIANCE FOR AUTOMATIC LATHES

André Bechler, Moutier, Switzerland

Application September 23, 1946, Serial No. 698,813
In Switzerland June 17, 1946

4 Claims. (Cl. 29—56)

This invention relates to drilling and tapping appliances in automatic lathes.

In automatic lathes with a drilling and tapping appliance having a rocking tool holder, i. e. an appliance in which the tools are brought alternately into alignment with the headstock spindle axis for drilling and tapping of the work piece, the movement of the tool holder is effected by a cam-driven lever carrying a toothed segment meshing with a pinion coupled with the rocking tool holder. Should a tool break off in the work piece, it is of the greatest importance to prevent any damage to the control mechanism and particularly if the aforesaid lever is driven by a grooved cam.

An object of my invention is to provide an appliance in which the said cam-driven lever is made in two pieces pivotally connected with each other and coupled by a clutch in such a manner that any relative displacement of the two pieces will disconnect the cam from the driving shaft.

Another object of my invention is to couple the two pieces of the cam-driven lever by a yieldable device which will be displaced by any accidental over-force and effect the above-mentioned relative displacement of the pieces.

Other objects and features will be apparent as the following description proceeds, reference being had to the accompanying drawings illustrating, by way of example, one embodiment of my invention, wherein:

Fig. 1 is a part sectional end elevation of the appliance as seen from the front end of the lathe, looking in the direction of the headstock spindle axis;

Fig. 2 is a plan view of the same, partly in section;

Fig. 3 is a side elevation, partly in section, of a portion of the device, an end view of which can be seen in Fig. 1;

Fig. 4 is a cross-sectional view of a friction coupling device forming part of the apparatus according to the invention.

Only the parts necessary for a clear understanding of the invention are shown on the drawing and these are shown, in part, schematically. Like parts are designated by like numerals in all figures of the drawing.

Referring more particularly to the drawing, tool holder 10 comprises two mandrels 11 and 12 holding the tools, i. e. a drill and a tap, which must alternately be brought into alignment with the headstock spindle axis. The tool holder is rigidly mounted on a shaft 13 carried by bearings 14 and having a pinion 15 fixed to it. The latter meshes with a toothed segment 16 provided on the end of an arm 17 of a two-piece control lever 18, the other arm 19 of which is moved by a pin 20 extending into groove 21 of a cam 22. This cam is keyed to a cam shaft 23 driven by a worm gear 24, 25. The worm 25 is loose on shaft 26 to which a stepped driving pulley 27 is fixed. One end of the coupling of worm 25 is provided with clams meshing with clams at the end of a clutch sleeve 28 which is slidable along shaft 26, to which it is connected by means of a key 29. A pin 31 extends from the end of a lever 42 and engages an annular groove 30 of clutch part 28. Lever 42 is fixed to a shaft 32, and a lever 33 fixed to shaft 32 bears against a plate 34, provided on the end of a stem 35 of a plunger 36 which has a conical head, the latter being slidably mounted in a cylindrical casing 37. This casing 37 is made in one piece with the arm or cam follower part 19 and turns with the latter about a shouldered screw-bolt 38 screwed to the arm 17 as seen in Fig. 4. The pivot constituted by member 38 is eccentric with respect to the fulcrum of the lever means 17, 19.

One end of a spring 39 bears against the bottom of the casing 37, the other against the back of the head of the plunger 36, for pressing the latter into a conical recess 40 provided on arm 17 and coupling parts 17 and 19 of lever 18, enabling the latter to transmit movements of pin 20 effected by the slotted cam 22 to the pinion 15 engaged by the toothed segment 16.

Should the segment 16 be overloaded for any accidental reason, the spring 39 will yield, so that the head of the plunger 36 will be forced out of the recess 40 and the plate 34 thereby moved backwards, so that the lever 33 will be rotated in clockwise direction (Fig. 2), thereby moving part 28 in the direction of arrow 41 and disconnecting it from worm 25 for interrupting the drive of shaft 23 by shaft 26 and stopping the machine.

After removal of the cause of the accidental overload of segment 16, arms 17 and 19 of the control lever 80 can be brought back to their normal positions shown on the drawing.

What I claim is:

1. A drilling and tapping appliance for automatic lathes, comprising, in combination, an oscillating tool holder; a gear wheel connected with said holder coaxially with its oscillation axis; a cam; means for rotating said cam; lever means comprising a first part having a toothed segment in mesh with said gear wheel, a cam follower part engaging said cam and being pivoted to said first part, and yieldable clutch means for yieldingly holding both parts in a pre-determined relative position; clutch means interposed in said means for rotating said cam for interrupting rotation of said cam upon disengagement of said last mentioned clutch means; and engaging and disengaging means connected with said last mentioned clutch means and with said yieldable clutch means for actuation thereby.

2. A drilling and tapping appliance for automatic lathes, comprising, in combination, an oscillating tool holder; a gear wheel connected with said holder coaxially with its oscillation axis; a cam; means for rotating said cam; lever means comprising a first part having a toothed segment in mesh with said gear wheel, a cam follower part engaging said cam and being pivoted to said first part eccentrically with respect to the fulcrum of said lever means, and yieldable clutch means for yieldingly holding both parts in a pre-determined relative position; clutch means interposed in said means for rotating said cam for interrupting rotation of said cam upon disengagement of said last mentioned clutch means; and engaging and disengaging means connected with said last mentioned clutch means; said yieldable clutch means comprising a member being displaced upon disengagement of the yieldable clutch means and being connected with said engaging and disengaging means for operation thereof.

3. In a drilling and tapping appliance for automatic lathes, the combination of a frame, a tool holder oscillatingly supported by said frame, a gear wheel connected with said tool holder coaxially with its oscillation axis, a cam having a groove, a drive shaft, gear means connected with said cam, a clutch disengageably connecting said drive shaft with said gear means, transmission lever means having a part swingably supported by said frame and comprising a toothed segment in mesh with said gear wheel, said transmission lever comprising a second part pivoted to said first part eccentrically with respect to the fulcrum of said lever means and having a portion engaging said groove, a recess in one of said parts, a pin connected with the other part movably in the direction of its longitudinal axis and transversely to the plane in which said lever means swings and adapted to engage said recess, and clutch actuating means engageable by said pin to disengage said clutch upon disengagement of said pin from said recess.

4. In a drilling and tapping appliance as defined in claim 3, a disc connected with the end of said pin distal with respect to said recess, and said clutch actuating means comprising a lever having an end positioned adjacent said disc.

ANDRÉ BECHLER.

REFERENCES CITED

The following references are of record in the file of this patent:

UNITED STATES PATENTS

| Number | Name | Date |
|---|---|---|
| 1,227,545 | Rankin | May 22, 1917 |
| 1,583,889 | Lariviere | May 11, 1926 |
| 1,965,714 | Sinclair | July 10, 1934 |
| 1,981,147 | Moller | Nov. 20, 1934 |
| 2,386,706 | Moessinger | Oct. 9, 1945 |
| 2,413,031 | Murch | Dec. 24, 1946 |